(12) United States Patent
Lemaistre et al.

(10) Patent No.: US 7,341,443 B2
(45) Date of Patent: Mar. 11, 2008

(54) MOULDING DEVICE FOR THE PRODUCTION OF CONTAINERS IN THERMOPLASTIC MATERIAL

(75) Inventors: Eric Lemaistre, Octeville-sur-Mer (FR); Régis Leblond, Octeville-sur-Mer (FR)

(73) Assignee: Sidel, Octeville sur Mer (FR)

(*) Notice: Subject to any disclaimer, the term of this patent is extended or adjusted under 35 U.S.C. 154(b) by 278 days.

(21) Appl. No.: 10/560,937

(22) PCT Filed: Jun. 11, 2004

(86) PCT No.: PCT/FR2004/001476

§ 371 (c)(1),
(2), (4) Date: Dec. 15, 2005

(87) PCT Pub. No.: WO2005/002821

PCT Pub. Date: Jan. 13, 2005

(65) Prior Publication Data

US 2006/0275525 A1   Dec. 7, 2006

(30) Foreign Application Priority Data

Jun. 19, 2003   (FR) ................................. 03 07391

(51) Int. Cl.
    B29C 49/36   (2006.01)
    B29C 49/56   (2006.01)
(52) U.S. Cl. ..................... 425/540; 425/541
(58) Field of Classification Search ................ 425/540, 425/541
    See application file for complete search history.

(56) References Cited

U.S. PATENT DOCUMENTS

| 3,825,396 A | 7/1974 | Kontz |
| 5,346,386 A * | 9/1994 | Albrecht et al. ............ 425/541 |
| 6,918,754 B2 * | 7/2005 | Albrecht ..................... 425/529 |
| 2007/0026098 A1* | 2/2007 | Lemaistre et al. .......... 425/170 |
| 2007/0190202 A1* | 8/2007 | Mie et al. ................... 425/541 |

FOREIGN PATENT DOCUMENTS

| FR | 2 646 802 A | 11/1990 |
| JP | 6 262671 A | 9/1994 |
| WO | WO 01/81060 A1 * | 11/2001 |

* cited by examiner

*Primary Examiner*—Robert B. Davis
(74) *Attorney, Agent, or Firm*—Sughrue Mion, PLLC (57) ABSTRACT

A molding device for the production of containers in thermoplastic material by blowing or blow-drawing, including a mold with two mold halves mutually mobile and provided with a locking device with first and second lock elements, in the form of catches, extending over the whole height of the respective mold halves and a projecting wing on one mold half, including a rotation surface on which a mobile piece is applied over the whole height thereof which includes the second lock element, such that, on blowing, the forces are taken by said mobile piece over the height of the mold by means of the rotation surface.

19 Claims, 6 Drawing Sheets

MOULDING DEVICE FOR THE PRODUCTION OF CONTAINERS IN THERMOPLASTIC MATERIAL

FIELD OF THE INVENTION

The present invention relates in general to the field of molding devices for blow-molding or stretch-blow-molding containers from heated thermoplastic preforms.

More specifically, the invention relates to improvements made to those of these devices that comprise at least one mold comprising at least two half-molds that can be moved with respect to each other between an open position in which they are parted from one another and a closed position in which they are firmly pressed against one another via collaborating respective bearing faces defining a parting line, locking means being provided to lock the two half-molds in the closed position, which locking means comprising on at least one side of the mold, a first lock element in the form of a hook secured fixedly to the first half-mold along the edge of the bearing face thereof, a second lock element in the form of a hook inverted with respect to the previous one and mounted such that it can pivot, on a rotation surface, on the second half-mold, and actuating means functionally associated with said second lock element in such a way as to move the latter transversely between a locked position in which it is engaged with the first lock element to lock the two half-molds in the closed position and an unlocked position in which it is disengaged from the first lock element to release the two half-molds that can then be parted from one another.

DESCRIPTION OF THE PRIOR ART

Document FR-A-2 646 802 discloses means for locking two half-molds in the closed position which means comprise a plurality of coupling fingers supported one above the other, coaxially, by a first half-mold and able to be moved parallel to the axis of the mold to engage in a plurality of respective accommodating slots supported by the second half-mold.

Such locking means are satisfactory and are currently in commonplace use in molding devices of the "hinged" mold type.

However, these locking means do have several significant disadvantages.

One disadvantage lies in the fact that the fingers and accommodating slots are supported in cantilever fashion by the first and second half-molds respectively. As the blowing pressure (for example typically of the order of $40 \times 10^5$ Pa) is applied, the supports of these fingers and accommodating slots, which project radially, are subjected to a force substantially tangential to the periphery of the mold. To prevent them from deforming or pulling out, these supports need to be solidly formed, and this increases the weight of the half-molds and also their cost.

Another disadvantage lies in the cantilevered structure of each finger, the base of which is set into a radially projecting support secured to one half-mold whereas, in the locked position, the free end of the finger is held in a corresponding accommodating slot of a radially projecting support secured to the other half-mold. Under the blowing force, each finger is subjected to a bending/shear stress which, once again, entails that each finger be solidly formed, making it heavy and expensive.

All these requirements lead to locking means that project appreciably from the periphery of the mold whereas, in installations comprising a great many molds and operating at high speed (rotary molding devices of the carousel type), the space available is very restricted. Furthermore, these locking means are heavy and increase the inertia of the half-molds, something which is detrimental to installations operating at high speed.

Finally, it must be emphasized that the method of locking/unlocking through the axial movement of a plurality of superposed ("in line") fingers entails relatively long travels so that the portion of each finger engaged in its corresponding slot is long enough and affords appropriate mechanical strength: it is therefore possible to provide only a restricted number of fingers and slots, spaced axially apart by an appreciable distance. This then finally results in a non-uniform distribution of the forces over the height of the mold.

SUMMARY OF THE INVENTION

There is therefore a remaining need for molds with a simplified, less bulky, less heavy, simpler and less expensive structure, this need being felt all the more keenly as higher production rates are being sought, entailing mechanisms that work more quickly with lower inertia.

For these reasons, the invention proposes a molding device as mentioned in the preamble which, being arranged in accordance with the invention, is characterized by the following combination of arrangements:

the first and second hook-shaped lock elements extend respectively over the entire height of the first and second half-molds, the second half-mold has, along the edge of its bearing face and over at least most of its height, a radially projecting flange shaped, on its face facing away from the bearing face, as an arc of a circle and able to constitute a convex rotation surface, and said second lock element belongs to one end of a moving part provided with a transverse projecting flange defining a bearing surface in the shape of an arc of a circle facing toward the second hook-shaped lock element and able to bear continuously over the entire height of said rotation surface of the second lock element.

Admittedly, locking means for molding devices that employ hook-shaped lock elements are already known, particularly from document U.S. Pat. No. 3,825,396. However, in that known arrangement, the hook-shaped lock elements are not distributed over the entire height of the mold which means that the top and bottom parts of the mold are not sufficiently firmly held. What is more, the hook-shaped lock element articulated to rotate on one of the two half-molds is supported by a spindle, conventionally passing through devises belonging to the lock element and to the half-mold. Upon blowing, this spindle is subjected to very high shear and possibly bending forces, which means that it needs to be sized accordingly and therefore has a large diameter and a high mass.

By contrast, by virtue of the structure proposed according to the invention, when the closed and locked mold is subjected to the blowing pressure, the force exerted on the second half-mold is reacted by said moving part, substantially continuously over most of its height. Furthermore, the rotational travel of the moving part and of the second lock element is very short, which shortens the locking/unlocking time and therefore makes it possible to envisage an evolution in the operating rate. The moving part with the second lock element has reduced dimensions and reduced mass, especially since, in certain exemplary embodiments, it can be manufactured at least partially in light metal (aluminum)

which means that the inertia of the moving components is low. Finally, the number of component parts is reduced and the structure of such locking means is simple, which means that the costs of manufacture can be lowered.

The devices according to the invention, although their potential applications are generalized, may find a quite particularly preferred application when the mold is of the hinged type with the two half-molds articulated to one another in terms of rotation on a shaft substantially parallel to one side of the parting line, in which case said locking means are provided on the opposite side of the two half-molds to said shaft. In particular, in molding devices in which each half-mold comprises a shell holder to which there is internally fixed a shell equipped with a molding half-cavity the parting line being defined by the two shells pressed together when the mold is in the closed position, provision is then made for the locking means to be supported by the two shell-holders.

In one preferred embodiment which simplifies manufacture, said face of the protruding flange of the second half-mold which faces away from the edge of the bearing face is hollowed out in the shape of an arc of a circle and houses a rotation spindle the free surface of which constitutes said rotation surface.

As a preference, the rotation spindle of the moving part supporting the second lock element is supported by a small number of hollowed-out devises secured to the second half-mold; as a greater preference, in this case, the devises are two in number, distant from one another and, in particular, situated near the respective ends of the spindle, and bear no closure force because they are there merely to support the moving part on the corresponding half-mold.

In another preferred exemplary embodiment, the rotation spindle of the moving part supporting the second lock element has a height appreciably greater than that of the second lock element and its two ends are engaged in two respective cups, secured to the second mold, whereby the moving part supporting the second lock element bears over practically the entirety of its height against the rotation spindle.

The first and second hook-shaped lock elements may, depending on the circumstances, be embodied in various ways. It is possible in particular to envisage for the first and second hook-shaped lock elements to extend continuously over their entire height, the two lock elements then being in the form of solid mold parts or portions. However, for example, with the desire to lighten the moving parts and reduce inertia, it is possible to envisage for at least the second hook-shaped lock element to extend discontinuously over its entire height and to comprise a multiplicity of hooks separated from one another and distributed over its entire height, the first hook-shaped lock element also possibly being able to be produced in this form.

Furthermore, it is highly advantageous for the rotation spindle to be arranged in the form of an eccentric spindle and for pivot control means to be associated with it, whereby the spindle is able to occupy two angular positions with respect to the moving part, namely a first position for which the moving part bears against the part of the spindle that has a minimum radius and can be made to move toward its locked position or toward its unlocked position and a second position for which the moving part bears against a part of the spindle that has a radius greater than the minimum radius and is immobilized in the locked position being subjected to traction between the first and second mutually-engaged lock elements and the rotation spindle.

The provisions according to the invention seem to find a particularly advantageous application, because of the space savings they afford and the increases in operating speed that they allow, in molding devices of the rotary carousel type, particularly those equipped with a multiplicity of molds, in which case the actuating means functionally associated with the second lock element comprise at least one idling cam follower roller supported by part of the moving part situated beyond its bearing surface with respect to the second lock element, said roller being able to collaborate with a fixed guide cam positioned laterally with respect to the rotary carousel. Advantageously then, the actuating means for actuating the second lock element comprise a return spring able to return the moving part to a position for which the second lock element is in the catching position.

Still in the case of molding devices of the carousel type, it is advantageous, in the case of said implementation of an eccentric rotation spindle, for the means for controlling the pivoting of the eccentric spindle to comprise an idling cam follower roller supported, via a transmission mechanism, by one end of said shaft, said roller being able to collaborate with a fixed guide cam positioned laterally with respect to the rotary carousel. Advantageously then, the means for controlling the pivoting of the eccentric spindle comprise a return spring able to return said spindle to its said first position.

The provisions that have just been set out may give rise to numerous embodiment variants.

In particular, it is conceivable for the first hook-shaped lock element to be attached and fixed to the first half-mold, or alternatively, as a variant, for it to be formed as an integral part of the first half-mold.

Likewise, it is conceivable for the second hook-shaped lock element to be attached and fixed to said moving part, or alternatively, as a variant, for it to be formed as an integral part of said moving part.

Provision may also be made for the devises that support the rotation spindle to be integral with the second half-mold or, as a variant, for said pivoting surface in the shape of an arc of a circle for the moving part to be supported by a mounting plate attached and fixed to the second half-mold.

As indicated above, the reaction of the forces, during the blowing operation, is distributed uniformly over the entire height of the half-molds. In addition, since the forces directed tangentially to the mold are reacted directly and since the number of devises supporting the rotation spindle is restricted to a minimum, the structures of each half-mold can be lightened, this option then seeming particularly favorable in the case of molds with a shell/shell-holder structure.

BRIEF DESCRIPTION OF THE DRAWINGS

The invention will be better understood from reading the detailed description which follows of certain preferred embodiments given purely by way of illustration. In this description, reference is made to the attached drawings in which.

DETAILED DESCRIPTION OF THE INVENTION

The arrangements according to the invention are improvements made to molding devices for the blow-molding or stretch-blow-molding of containers, such as bottles, from heated thermoplastic (for example PET) preforms. Such a molding device comprises at least one mold comprising at least two half-molds (and possibly a third part that forms an axially movable mold bottom) which can be moved relative to one another between an open position in which they are parted from one another and a closed position in which they are pressed firmly against one another by collaborating respective faces defining a parting line, locking means being provided to lock the two half-molds in the closed position and prevent them from parting or gaping when the blowing fluid is introduced under very high pressure (for example typically of the order of $40 \times 10^5$ Pa).

Commonly, such molding devices may comprise a multiplicity of molds and may therefore be arranged in the form of a rotary device or carousel with the molds arranged at the periphery, the various functions of opening/closing, locking/unlocking, etc. the molds possibly being controlled in sequence as the carousel rotates by cam follower rollers borne by the molds and collaborating with guide cams mounted fixedly on the outside of the rotary part.

Although the arrangements according to the invention can be applied to any type of mold, they are particularly applicable to molds equipped with two half-molds that rotate one with respect to the other, or to hinged molds, which are currently in very widespread use, and it is therefore in the context of a hinged mold that the arrangements of the invention will be set out in detail, without the protection being restricted to this one type of mold.

Figure 3:
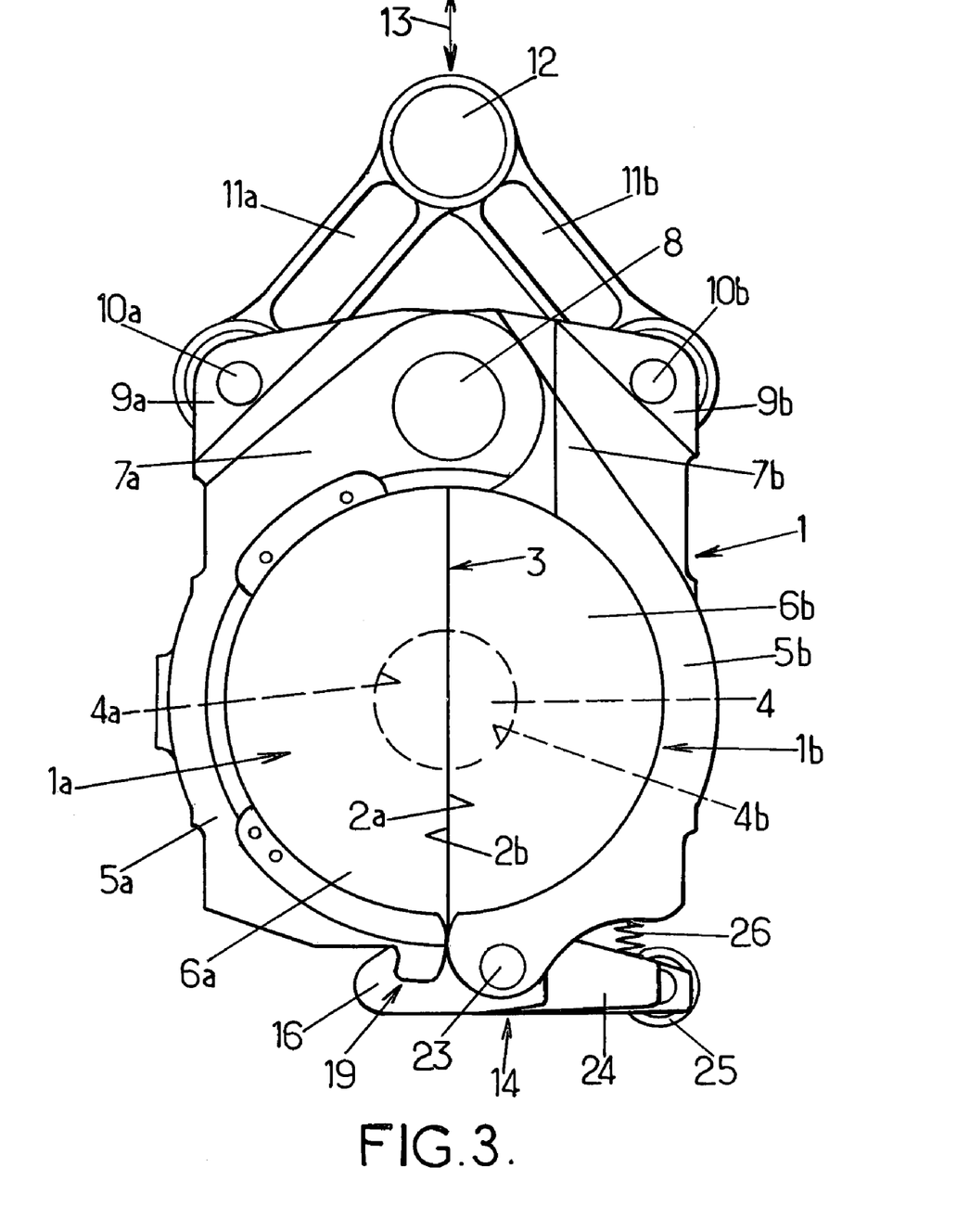
FIG. 3 is a view from above of the entirety of a hinged mold equipped with locking means according to the embodiment variant of FIG. 2.

FIG. 3 illustrates, in simplified form, in a view from above, the general arrangement of a hinged mold, denoted in its entirety by the reference 1, comprising two half-molds 1a and 1b (it also being possible for an axially movable bottom—not visible—to be provided at the base of the mold). The two half-molds respectively have two collaborating faces or bearing faces 2a, 2b which, in the closed position, define a parting line 3. The collaborating faces are hollowed out with, respectively, two half-cavities 4a, 4b which, when put together, define the molding volume 4 that has the external shape of the container that is to be obtained.

In the example more particularly illustrated in FIG. 3, each half-mold 1a, 1b has a composite structure and comprises an external framework or shell-holder 5a, 5b and an interior molding part or shell 6a, 6b which is fixed removably into the respective shell holder and comprises said respective half-cavity 4a, 4b.

The half-molds 1a, 1b (in this instance the shell-holders 5a, 5b) comprise, on one side, respective protruding cheeks 7a, 7b which are interleaved with one another in a superposed fashion and have passing through them a shaft 8 arranged in the continuation of the parting line.

Furthermore, two projecting lugs 9a, 9b respectively support in rotation, via spindles 10a, 10b distant from one another on each side of the shaft 8, the ends of two actuating link rods 11a, 11b the other two respective ends of which are connected with the ability to rotate freely on a spindle 12 which can be moved in a linear fashion (arrow 13) toward the spindle 8 or in the opposite direction, by drive means (not shown).

On the other side of the parting line 3 and on the opposite side to the shaft 8 there are locking means 14 intended to keep the two half-molds 1a, 1b in the closed position as the blowing pressure is applied.

Figure 1A:
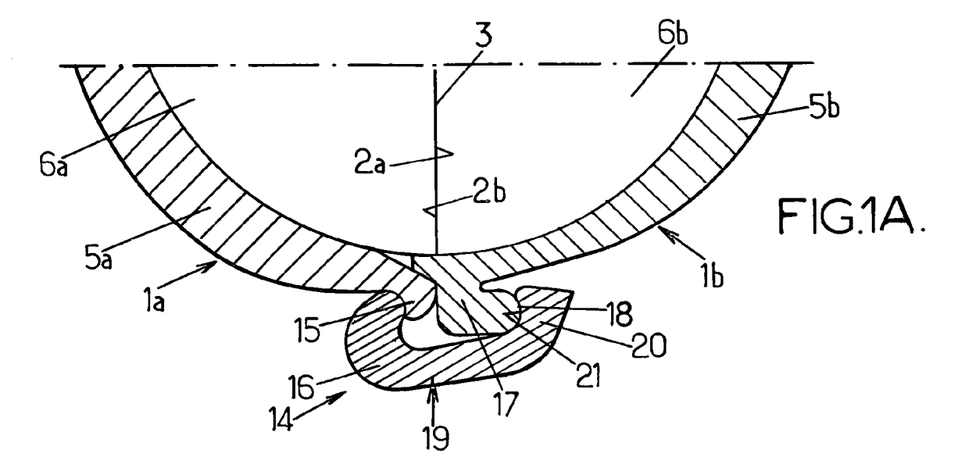
FIGS. 1A and 1B are schematic views from above, in section, of part of a mold of the hinged type equipped with locking means in accordance with the invention, shown in the locked position and in the unlocked position respectively.
Figure 1B:
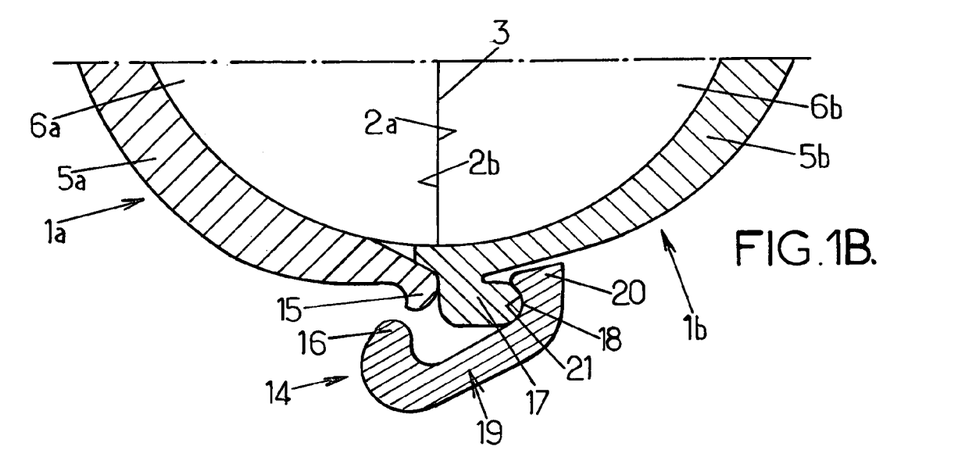

Referring now to FIG. 1A, the locking means 14 comprise:

a first hook-shaped lock element 15 which is secured fixedly to the first half-mold 1a (the left-hand one in FIG. 1A) which extends substantially along the edge of the bearing face 2a thereof, a second hook-shaped lock element 16, inverted with respect to the previous one and mounted to pivot, on a rotation surface, on the second half-mold 1b (to the right in FIG. 1B), and actuating means functionally associated with the second lock element 16 so as to move the latter transversely to the mold between a position of engagement with the first lock element 15 (locking the mold 1 in the closed position, as illustrated in FIG. 1A) and a position of disengagement from the first lock element 15 (unlocking the mold 1, as illustrated in FIG. 1B).

The first lock element 15 extends over the entire height of the first half-mold 1a and the second lock element 16 extends over the entire height of the second half-mold 1b.

The second half-mold 1b comprises, along the edge of its bearing face 2b and over at least most of its height, a radially projecting flange 17 shaped, on its face facing away from the bearing face 2b, as an arc of a circle and able to constitute said rotation surface 18 (which is convex in FIGS. 1A and 1B) for the second lock element 16.

This being the case, the second lock element 16 belongs to a moving part 19 which extends over the entire height of the second half-mold 1b. One of the edges of this moving part 19 forms the second hook-shaped lock element 16, while its opposite edge is provided with a transverse projecting flange 20 defining a bearing surface in the shape of an arc of a circle 21 (concave in FIGS. 1A and 1B) which faces toward the second lock element 16 and is able to bear over the entire height of said rotation surface 18.

By virtue of this arrangement, the two half-molds 1a, 1b are kept in the closed position by the moving part 19 the two opposite edges (second lock element 16 and flange 20) of which are engaged against complementary parts of the first half-mold 1a (first lock element 15) and of the second half-mold 1b (projecting flange 17). Furthermore, the two half-molds 1a, 1b are held in the closed position over the entire height of the mold substantially continuously, rather than discontinuously as was the case with the locking means involving moving fingers used hitherto.

Figure 2:
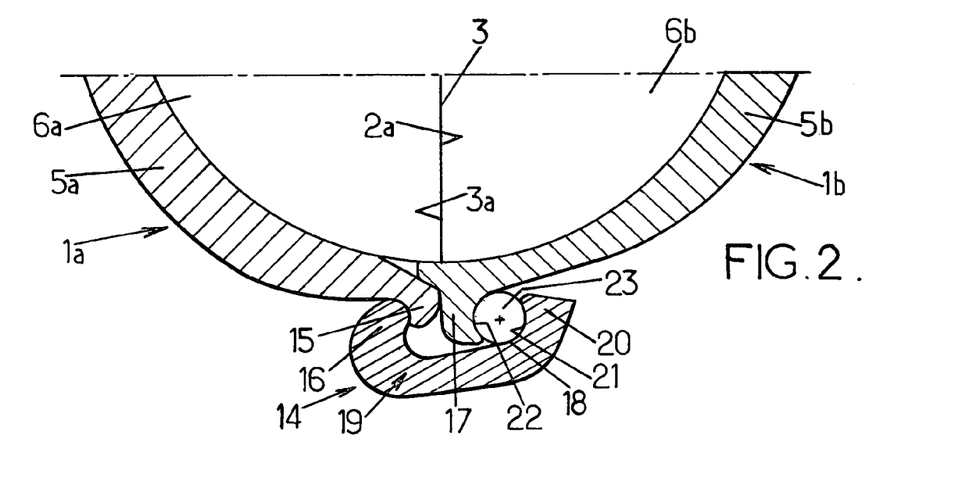
FIG. 2 is a schematic view from above, in section, of part of a mold of the hinged type showing a practical embodiment variant of the locking means of FIG. 1A.

Producing the bearing surface in the shape of an arc of a circle 18 may prove difficult and expensive to achieve, and one concrete exemplary embodiment which is simpler and more economical to manufacture is illustrated in FIG. 2. Here, the projecting flange 17 has its face facing away from the bearing face 2b hollowed out by a groove 22 in the shape of an arc of a circle extending over the entire height thereof and a spindle 23 is engaged in said groove. Said rotation surface 18 here is a convex surface consisting of the surface of the spindle 23. In such a case, in the locked position illustrated in FIG. 2, the forces that tend to part the two half-molds 1a, 1b from one another during blowing are reacted by the moving part 19, via, on the side of the second half-mold 1b, the rotation spindle 23. By giving the grooves 21 of the moving part 19 and 22 of the flange 17 of the second half-mold 1b perfectly matched shapes that complement the external surface of the spindle 23, perfect reaction of the forces over the entire height of the mold is guaranteed, with lower pressures on the contact surfaces. It is then possible to produce parts that are less massive and therefore less heavy, which therefore have lower inertias; what is more, the angular excursion of the moving part 19 between the locked and unlocked positions is small, and the shorter travel of this part, which manifests itself in a shorter transit time, contributes to permitting an increase in operating rates.

To control the movement of the moving part 19 it is possible, as illustrated in FIG. 3, to provide at the base of the moving part an extension 24 thereof the end of which supports a cam follower roller 25 that idles freely. Since the mold 1 belongs to a molding device of the carousel type, the roller 25, as the device rotates, may come into contact with a guide cam (not shown) mounted fixedly and laterally with respect to the rotating part. It is thus possible selectively to control the movement of the moving part 19. To simplify the set-up of these control means, it is possible to envisage for them to comprise a spring 26 associated with the extension 24 of the moving part 19 and able to return the latter to a position knocked down toward the mold: thus, the moving part 19 is kept in a position such that, as the two half-molds approach one another, the moving part 19 engages on the first lock element 15 automatically: locking is therefore obtained automatically and ensured. The interaction between the follower roller 25 and the guide cam then occurs only to bring about the disengagement of the moving part 19 from the first lock element 15 with a view to opening the mold.

In the examples illustrated schematically in FIGS. 1A, 1B, 2 and 3, the first lock element 15 is shown as forming an integral part of the first half-mold 1a, particularly as forming an integral part of the first shell-holder 5a.

Figure 4:
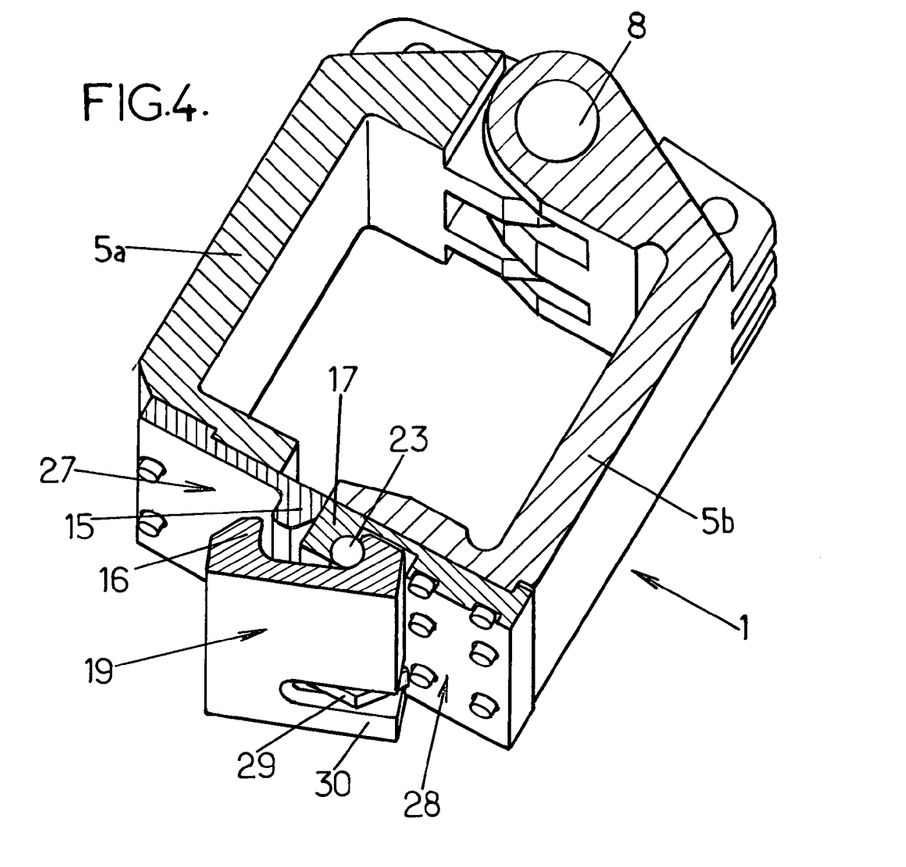
FIG. 4 is a part view, in section and in perspective, of another embodiment variant of the locking means of FIG. 2.

It is of course possible, as a variant, to envisage for the first lock element 15 to belong to the part attached to the first half-mold, for example in the form of a plate 27 bolted to the first half-mold 1a, particularly the first shell-holder 5a, as illustrated in FIG. 4 (which FIG. 4 illustrates, in section, another configuration of hinged mold with semi-rectangular shell-holders 5a, 5b—the shells not being shown in order to make the drawing easier to understand).

Likewise, the transverse flange 17 too may belong to a part attached to the second half-mold 1b or the second shell-holder 5b, for example in the form of a plate 28 bolted to the second half-mold 1b or to the second shell-holder 5b, as illustrated in FIG. 4.

The arrangements proposed with reference to FIG. 4 allow the structure and therefore the manufacture of the first and/or second half-mold or of the first and/or second shell-holder to be simplified. Furthermore, it is possible to make one and/or the other of the lock elements 15, 16 from different metals from the corresponding half-mold or shell-holder, particularly when these are aluminum castings (it then being possible for the lock elements to be made of steel).

To retain the spindle 23, provision may be made for the second half-mold 1b or the second shell-holder 5b, or alternatively still, said plate 28, to comprise a small number of hollowed-out projecting devises 29 through which the spindle 23 passes. Advantageously, just two devises 29 may be provided, these being located near the respective ends of the spindle 23 (the bottom clevis 29 is visible in FIG. 4). Likewise, the lower and upper parts of the moving part 19 are arranged like a devise 30 accommodating the ends of the spindle 23. Because the forces are reacted transversely by the bearing parts on either side of the spindle 23, the devises 29, 30 do not have to transmit any force and their sole function is to retain the spindle outside of the blowing periods: the spindle does not therefore have to be fitted with excessively close tolerances and the devises can be sized as small as possible in order to leave the spindle clear over a maximum height so as to increase the bearing length.

Figure 5:
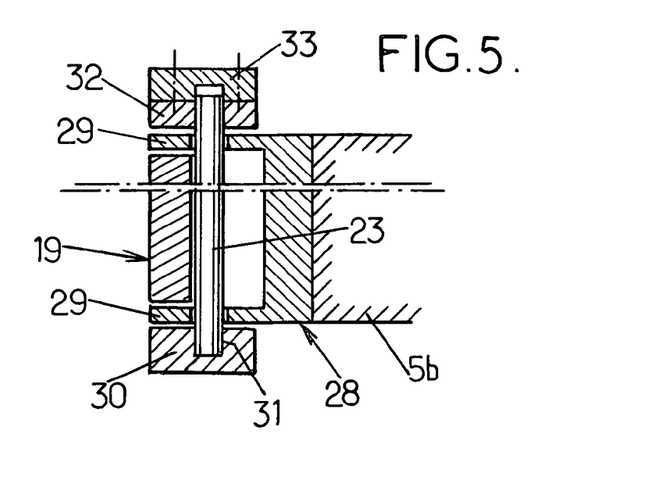
FIG. 5 is a part view in section of an embodiment variant of part of the arrangement illustrated in FIG. 4.

This bearing length can be increased still further by arranging the upper and lower ends of the spindle 23 in cups provided on the moving part 19. For example, as illustrated in FIG. 5, the lower part 30 of the moving part 19 may be positioned under the lower face of the plate 28 so that the clevis 29 lies flush with this lower face. This lower part 30 is hollowed out to form a cup 31 accommodating the lower end of the spindle 23. The upper part 32 of the moving part is bored and the upper end of the spindle 23 passes through it. It may possibly be capped by a cover plate 33 protecting the end of the spindle.

Figure 6A:
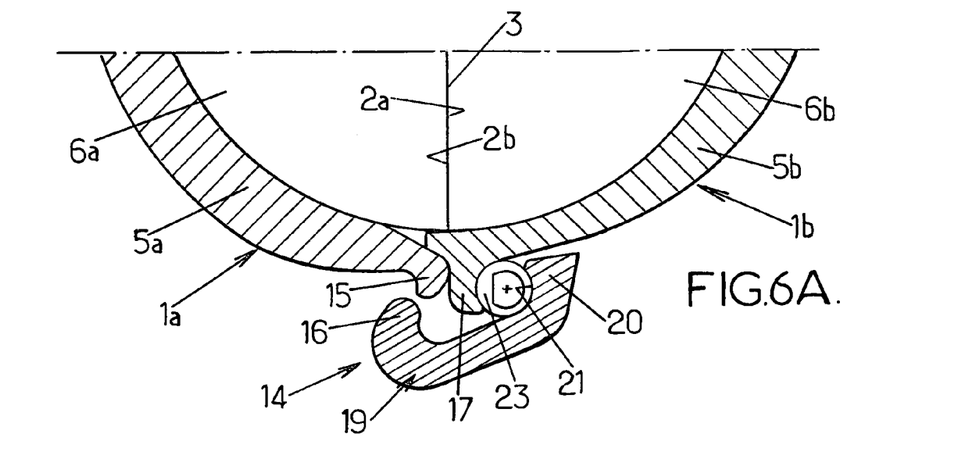
FIGS. 6A, 6B and 6C are schematic views from above, in section, of part of a hinged mold showing yet another embodiment variant of the locking means in three functional positions respectively.
Figure 6B:
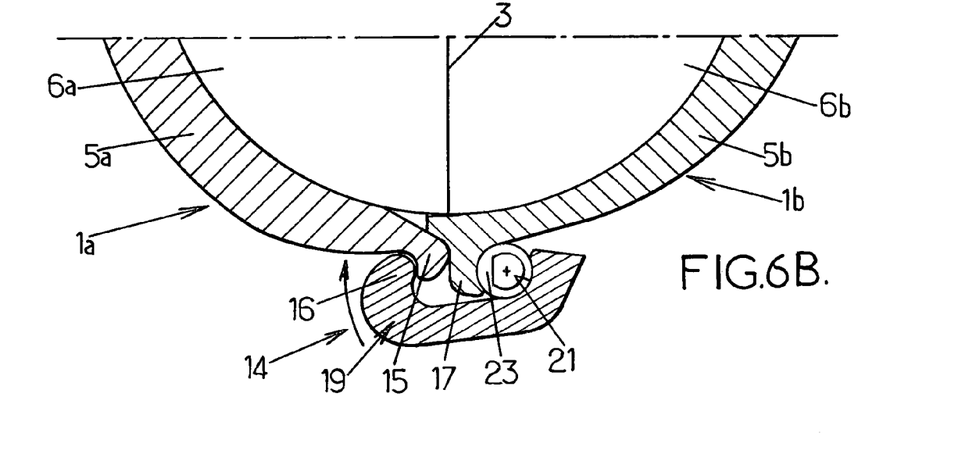
Figure 6C:
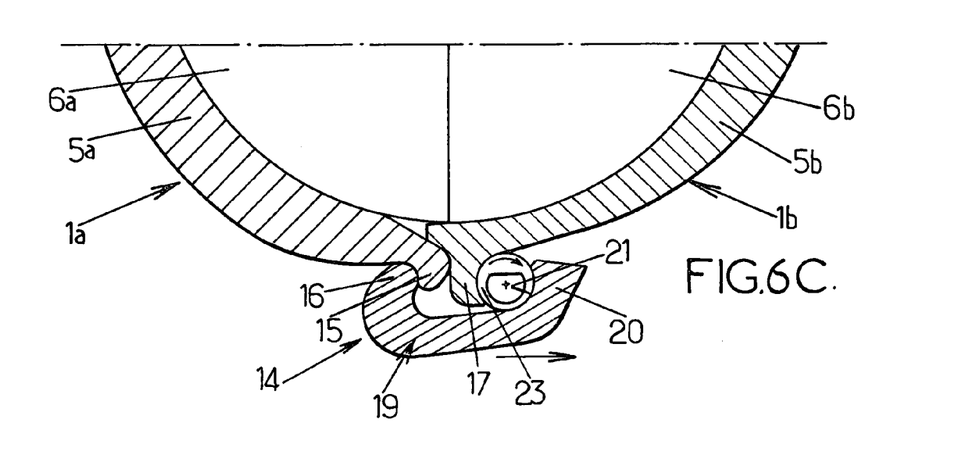

FIGS. 6A to 6C illustrate an embodiment variant that is highly advantageous because it allows locking to be confirmed. The arrangement is identical to the one illustrated in FIG. 2 except that the spindle 23 is an eccentric pivoting spindle.

In the unlocked position illustrated in FIG. 6A, the spindle 23 is oriented angularly with its smallest-radius portion in contact with the groove 21 of the moving part 19.

Next, the moving part 19 is pivoted about the spindle 23 to engage in the hook-shaped lock element 15 in order to lock the two half-molds 1a, 1b in the closed position (FIG. 6B).

Finally, the spindle 23 is rotated on itself so that the radius of the portion engaged in the groove 21 increases, and this has the effect of pushing the moving part 19 to the right (in FIG. 6C) and therefore of forcing the second lock element 16 against the first lock element 15 of the first half-mold 1a. Simple confirmation of the locking is thus obtained.

Upon unlocking, rotating the spindle 23 in the opposite direction releases the second lock element 16 from the first lock element 15 which is fixed and the outward pivoting of the moving part 19 can then be performed.

The rotation of the spindle 23 may for example be obtained (FIG. 7) by rigidly associating with it, at one of its ends, an arm 34 supporting, at its free end, an idling cam follower roller 35 which is able to collaborate with a guide cam positioned, fixedly, laterally with respect to the rotary part of a molding device of the carousel type.

Figure 7:
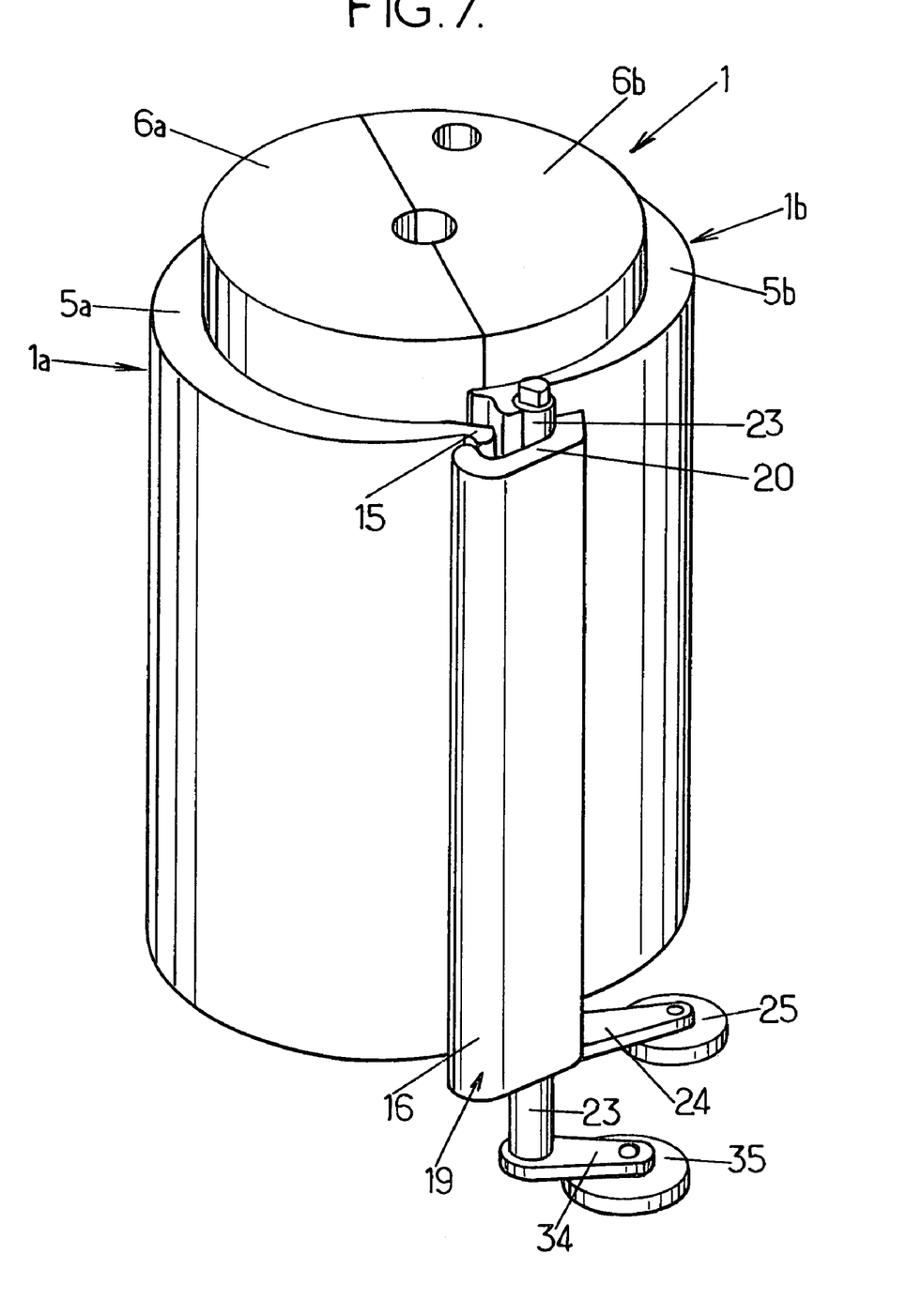
FIG. 7 is a schematic view in perspective of the entirety of a mold arranged according to the invention.

FIG. 7 schematically illustrates in perspective the essential elements of a mold 1 arranged according to the invention as illustrated in FIGS. 6A to 6C, the mold 1 here being visible over its entire height.

By virtue of the arrangements employed in accordance with the invention, the forces to which the shell-holders 5a, 5b are subjected are lower than in the earlier arrangements, particularly because of a lower mass and a lower inertia. This being the case, it is possible, in conjunction with a shorter angular excursion of the moving part 19 of the locking means, to envisage increasing the production rate of the mold.

Figure 8:
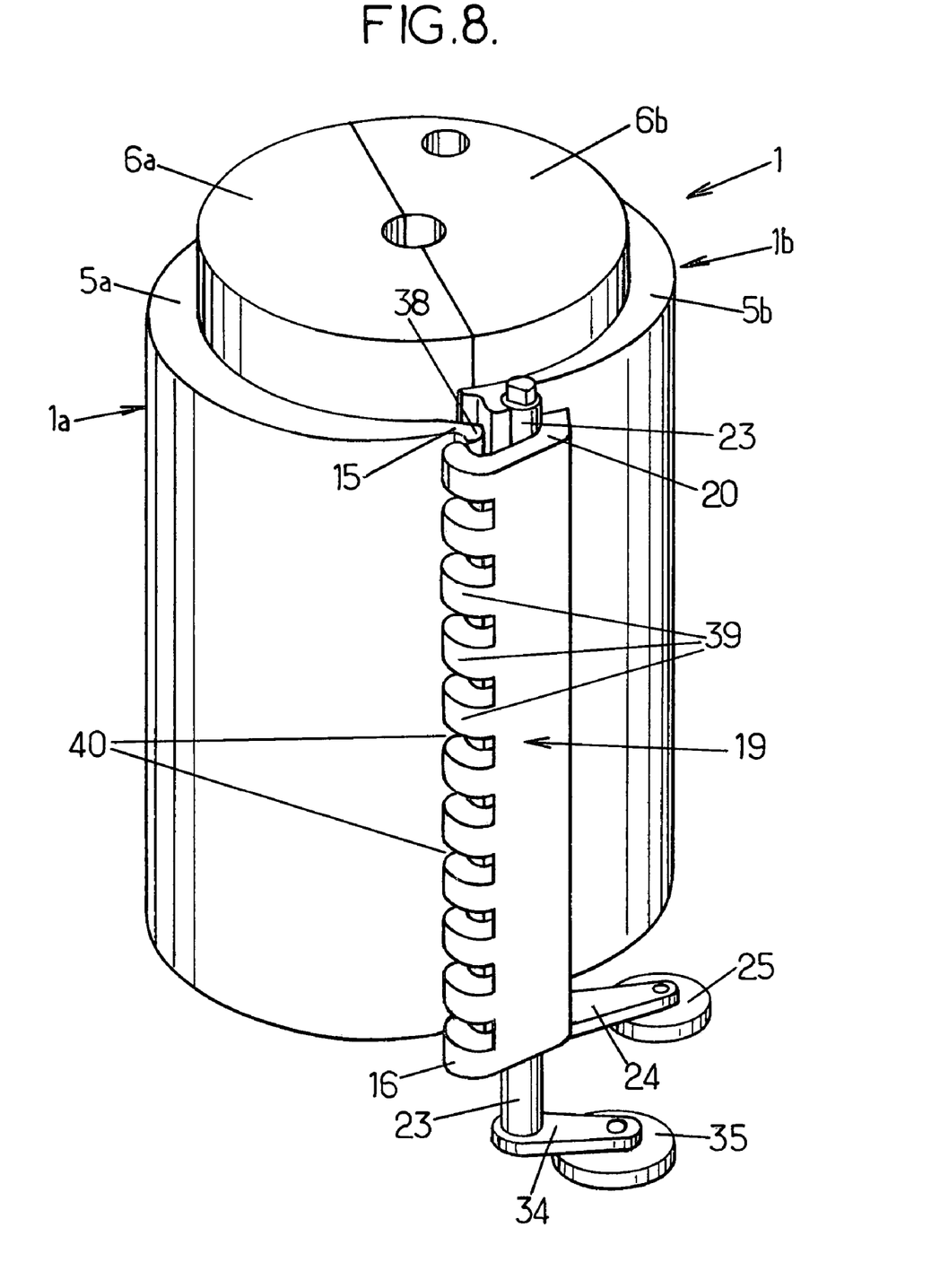
FIG. 8 is a schematic view in perspective of an embodiment variant of the mold illustrated in FIG. 7.

Still with a view to lightening the moving parts and to reducing inertia in order to allow production rates to be increased, it is also possible to envisage forming the first lock element 15 and/or the second lock element 16 in the form of parts extending discontinuously over the entire height of the half-molds 1a, 1b, as illustrated in FIG. 8. In the example illustrated in FIG. 8, it has been assumed that the two lock elements 15 and 16 were produced in the form of a multiplicity of hooks 38, 39 respectively, discontinuous, positioned facing each other and able to engage in pairs. If the number of these pairs of hooks 38, 39 is high enough, in other words if the spacings 40 between the hooks are not too great (for example it is possible to anticipate spacings 40 having approximately the same height as the hooks 38, 39), then an appreciably uniform reaction of force is obtained, similar to that afforded by continuous hook-type lock elements as illustrated in FIG. 7. To give a concrete example, the number of these hooks 38, 39 may be of the order of about ten distributed over a height of the order of 35 cm (a mold for a 1.5-liter bottle for example).

As a variant, it is possible to envisage associating a continuous hook lock element (for example the first lock element 15 which is fixed) and a multiple-hook lock element (particularly the second lock element 16 which is the moving one).

The invention claimed is:

1. A molding device for blow-molding or stretch-blow-molding containers from heated thermoplastic preforms, said device comprising at least one mold comprising at least two half-molds that can be moved with respect to each other between an open position in which they are parted from one another and a closed position in which they are firmly pressed against one another via collaborating respective bearing faces defining a parting line, locking means being provided to lock the two half-molds in the closed position, which locking means comprising on at least one side of the mold, a first lock element in the form of a hook secured fixedly to the first half-mold along the edge of the bearing face thereof, a second lock element in the form of a hook inverted with respect to the previous one and mounted such that it can pivot, on a rotation surface, on the second half-mold, and actuating means functionally associated with said second lock element in such a way as to move the latter transversely between a locked position in which it is engaged with the first lock element to lock the two half-molds in the closed position and an unlocked position in which it is disengaged from the first lock element to release the two half-molds that can then be parted from one another, wherein, in addition:

the first and second hook-shaped lock elements extend respectively over the entire height of the first and second half-molds, the second half-mold has, along the edge of its bearing face and over at least most of its height, a radially projecting flange shaped, on its face facing away from the bearing face, as an arc of a circle and able to constitute a rotation surface, and said second lock element belongs to one end of a moving part provided with a transverse projecting flange defining a bearing surface in the shape of an arc of a circle facing toward the second hook-shaped lock element and able to bear continuously over the entire height of said rotation surface of the second lock element, whereby, when the mold is closed and locked and subjected to the blowing pressure, the force to which the second half-mold is subjected is reacted, by said moving part, substantially continuously over most of its height via said rotation surface.

2. The molding device as claimed in claim 1, in which the mold is of the hinged type with the two half-molds articulated to one another in terms of rotation on a shaft substantially parallel to one side of the parting line, wherein said locking means are provided on the opposite side of the two half-molds to said shaft.

3. The molding device as claimed in claim 1, in which each half-mold comprises a shell holder to which there is internally fixed a shell equipped with a molding half-cavity the parting line being defined by the two shells pressed together when the mold is in the closed position, wherein the locking means are supported by the two shell-holders.

4. The molding device as claimed in claim 1, wherein said face of the protruding flange of the second half-mold which faces away from the edge of the bearing face is hollowed out in the shape of an arc of a circle and houses a rotation spindle the free surface of which constitutes said rotation surface.

5. The molding device as claimed in claim 4, wherein the rotation spindle of the moving part supporting the second lock element is supported by a small number of hollowed-out devises secured to the second half-mold.

6. The molding device as claimed in claim 5, wherein the devises are two in number, distant from one another and, in particular, situated near the respective ends of the spindle.

7. The molding device as claimed in claim 4, wherein the rotation spindle of the moving part supporting the second lock element has a height appreciably greater than that of the second lock element and in that its two ends are engaged in two respective cups, secured to the second mold, whereby the moving part supporting the second lock element bears over substantially the entirety of its height against the rotation spindle.

8. The molding device as claimed in claim 1, wherein the first and second hook-shaped lock elements extend continuously over their entire height.

9. The molding device as claimed in claim 1, wherein at least the second hook-shaped lock element extends discontinuously over its entire height and comprises a multiplicity of hooks separated from one another and distributed over its entire height.

10. The molding device as claimed in claim 4, wherein the rotation spindle is arranged in the form of an eccentric spindle and in that pivot control means are associated with it, whereby the spindle is able to occupy two angular positions with respect to the moving part, namely a position at minimum radius for which the moving part bears against the part of the spindle that has a minimum radius and for which the moving part can be made to move toward its locked position or toward its unlocked position and a position at a greater radius for which the moving part bears against a part of the spindle that has a radius greater than the minimum radius and for which the moving part, in the locked position, is immobilized in this position being subjected to traction between the first and second mutually-engaged lock elements and the rotation spindle.

11. The molding device as claimed in claim 1, this device being of the rotary carousel type, wherein the actuating means functionally associated with the second lock element comprise at least one idling cam follower roller supported by part of the moving part situated beyond its bearing surface with respect to the second lock element, said roller being able to collaborate with a fixed guide cam positioned laterally with respect to the rotary carousel.

12. The molding device as claimed in claim 11, wherein the actuating means for actuating the second lock element comprise a return spring able to return the moving part to a position for which the second lock element is in the catching position.

13. The molding device as claimed in claim 10, this device being of the rotary carousel type, wherein the means for controlling the pivoting of the eccentric spindle comprise an idling cam follower roller supported, via a transmission mechanism, by one end of said shaft, said roller being able to collaborate with a fixed guide cam positioned laterally with respect to the rotary carousel.

14. The molding device as claimed in claim 10, this device being of the rotary carousel type, wherein the means for controlling the pivoting of the eccentric spindle comprise an idling cam follower roller supported, via a transmission mechanism, by one end of said shaft, said roller being able to collaborate with a fixed guide cam positioned laterally with respect to the rotary carousel, and in that the means for controlling the pivoting of the eccentric spindle comprise a return spring able to return said spindle to its position of minimum radius.

15. The molding device as claimed in claim 1, wherein that the first hook-shaped lock element is attached and fixed to the first half-mold.

16. The molding device as claimed in claim 1, wherein the first hook-shaped lock element is formed as an integral part of the first half-mold.

17. The molding device as claimed in claim 1, wherein the second hook-shaped lock element is attached and fixed to said moving part.

18. The molding device as claimed in claim 1, wherein the second hook-shaped lock element is formed as an integral part of said moving part.

19. The molding device as claimed in claim 1, wherein said pivoting surface in the shape of an arc of a circle for the moving part is supported by a mounting plate attached and fixed to the second half-mold.

* * * * *